United States Patent [19]
Walker

[11] Patent Number: 5,682,423
[45] Date of Patent: Oct. 28, 1997

[54] ELECTRICAL POWER AND TELEPHONE RINGER SIGNAL DISTRIBUTION SYSTEM

[75] Inventor: David Walker, Staffordshire, United Kingdom

[73] Assignee: GPT Limited, United Kingdom

[21] Appl. No.: 654,185

[22] Filed: May 28, 1996

Related U.S. Application Data

[63] Continuation-in-part of Ser. No. 558,345, Nov. 16, 1995, abandoned, which is a continuation of Ser. No. 153,271, Nov. 16, 1993, abandoned, which is a continuation of Ser. No. 726,355, Jul. 5, 1991, abandoned.

[30] Foreign Application Priority Data

Jul. 25, 1990 [GB] United Kingdom ............. 9016362

[51] Int. Cl.$^6$ ........................................... H04M 19/02
[52] U.S. Cl. ..................... 379/252; 379/322; 379/324; 379/334
[58] Field of Search ............................. 379/252, 322, 379/323, 324, 333, 334, 335, 307, 318

[56] References Cited

U.S. PATENT DOCUMENTS

| | | | |
|---|---|---|---|
| 3,778,555 | 12/1973 | Nordling et al. | 379/334 |
| 3,917,908 | 11/1975 | Galluccio | 379/334 |
| 4,230,913 | 10/1980 | Brothers et al. | 379/334 |
| 4,310,728 | 1/1982 | Dumont | 379/252 |
| 4,984,267 | 1/1991 | Martinez | 379/324 |

*Primary Examiner*—Ahmad F. Matar
*Attorney, Agent, or Firm*—Kirschstein, et al.

[57] ABSTRACT

A telephony system includes a plurality of local network terminations connected to a street cabinet in turn connected to an exchange. The street cabinet has a power supply for supplying voltage, a clock for generating a master ringer signal, and a modulator for modulating the voltage with the ringer signal. The filters extract the DC voltage and the ringer signal. The extracted DC voltage and the extracted ringer signal obviate the prior art requirements to provide a separate DC power supply and a separate clock within each local network termination, thereby avoiding duplication of components within each local network termination.

6 Claims, 3 Drawing Sheets

ELECTRICAL POWER AND TELEPHONE RINGER SIGNAL DISTRIBUTION SYSTEM

CROSS REFERENCE TO RELATED APPLICATIONS

This application is a continuation-in-part of U.S. patent application Ser. No. 08/558,345, filed Nov. 16, 1995, now abandoned which, is a continuation of U.S. patent application Ser. No. 08/153,271, filed Nov. 16, 1993, now abandoned which, is a continuation of U.S. patent application Ser. No. 07/726,355, filed Jul. 5, 1991, now abandoned.

BACKGROUND OF THE INVENTION

The present invention relates to efficiently distributing electrical power and ringer signals to multiple telephone subscribers in a telephony system.

Where a telephone customer's or subscriber's equipment is connected to the system by conducting cables along which the communication data (analog and/or digital) signals are transmitted, it is normal practice for the electrical power required to operate electrical components at the customer's equipment, to be supplied to the customer's equipment along those conducting cables. Modern telephone practice demands that power for telephones should be derived local to the customer's equipment, rather than being supplied from a remote telephone exchange, particularly when the data transmission medium from the exchange to the vicinity of the customer is either by radio waves, or along optical fibers, or where the conducting cables are too long for the economic transmission of power.

Similar considerations apply for the telephone ringer signal (25 Hz in the United Kingdom; 30 Hz in the United States), i.e., the signal from which the various tones to be heard in a telephone earpiece can be generated. Conventionally, the ringer signal is generated locally, typically at a footway box, rather than being supplied from the more remote telephone exchange. The local duplication of components, both for supplying power and ringer signals, is expensive not only for installation, but also for maintenance.

SUMMARY OF THE INVENTION

The present invention is concerned with more efficiently distributing power and ringer signals in such systems.

Accordingly, the invention relates to an arrangement for distributing electrical power and ringer signals in a telephone system to individual telephone subscribers. The system includes a telephone exchange or central office, and a plurality of street cabinets connected to, and located remotely from, the exchange. Each street cabinet includes a rectifier for converting AC mains voltage supplied to the respective street cabinet to DC voltage; a clock or oscillator for generating a master ringer signal at a ringer frequency; and a modulator for modulating the DC voltage with the master ringer signal to generate a modulated signal. A plurality of footway boxes or local network terminations is each connected to a plurality of individual telephone subscribers.

The present invention further proposes a distribution cable connected between each street cabinet and a group of said plurality of local network terminations, for distributing the modulated signal to each local network termination in the group. Each local network termination in the group includes a rectifier for rectifying the modulated signal supplied to the respective termination to supply DC voltage for the respective termination, and a filter for filtering the modulated signal supplied to the respective termination to supply the ringer signals for the individual subscribers.

BRIEF DESCRIPTION OF THE DRAWINGS

In order that the invention may be more readily understood, an embodiment thereof will now be described by way of example and with reference to the accompanying drawings, in which.

DETAILED DESCRIPTION OF THE PREFERRED EMBODIMENT

Figure 1:
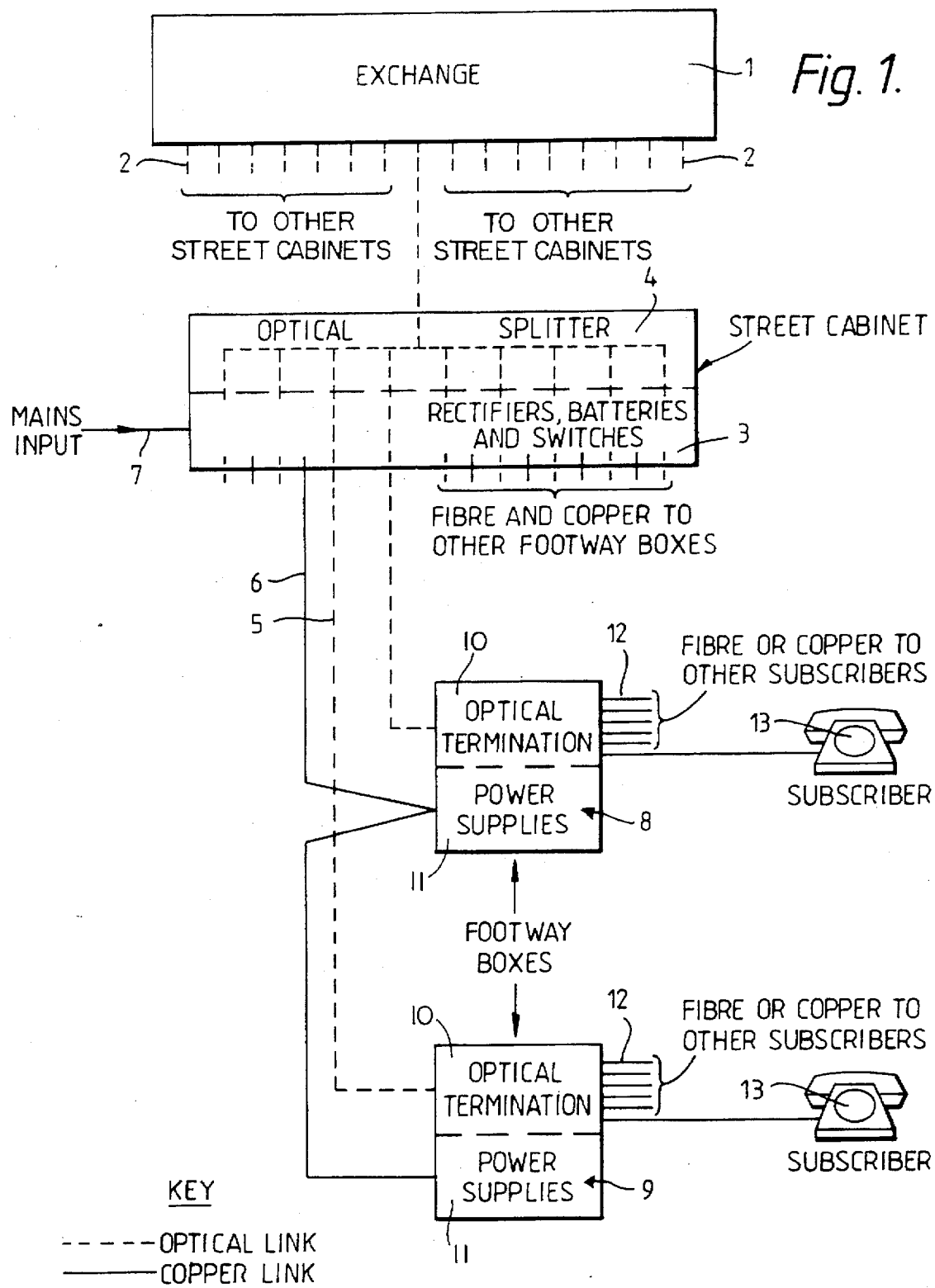
FIG. 1 is a block diagram of a telephony network according to the present invention.

Referring now to FIG. 1 of the drawings, this shows a central office or telephone exchange 1 having a number of optical fibers or output lines 2 for transmission of telephone data signals leading to street cabinets. Only one street cabinet, given the reference 3, is shown. It will be appreciated that all the other street cabinets will be similar to cabinet 3 which contains an optical splitter indicated at 4 to passively split the incoming optical signal on line 2 for transmission on to a plurality of footway boxes 8, 9 via optical fiber cables 5. Typically, each street cabinet 3 serves twelve or so footway boxes 8, 9.

Figure 2:
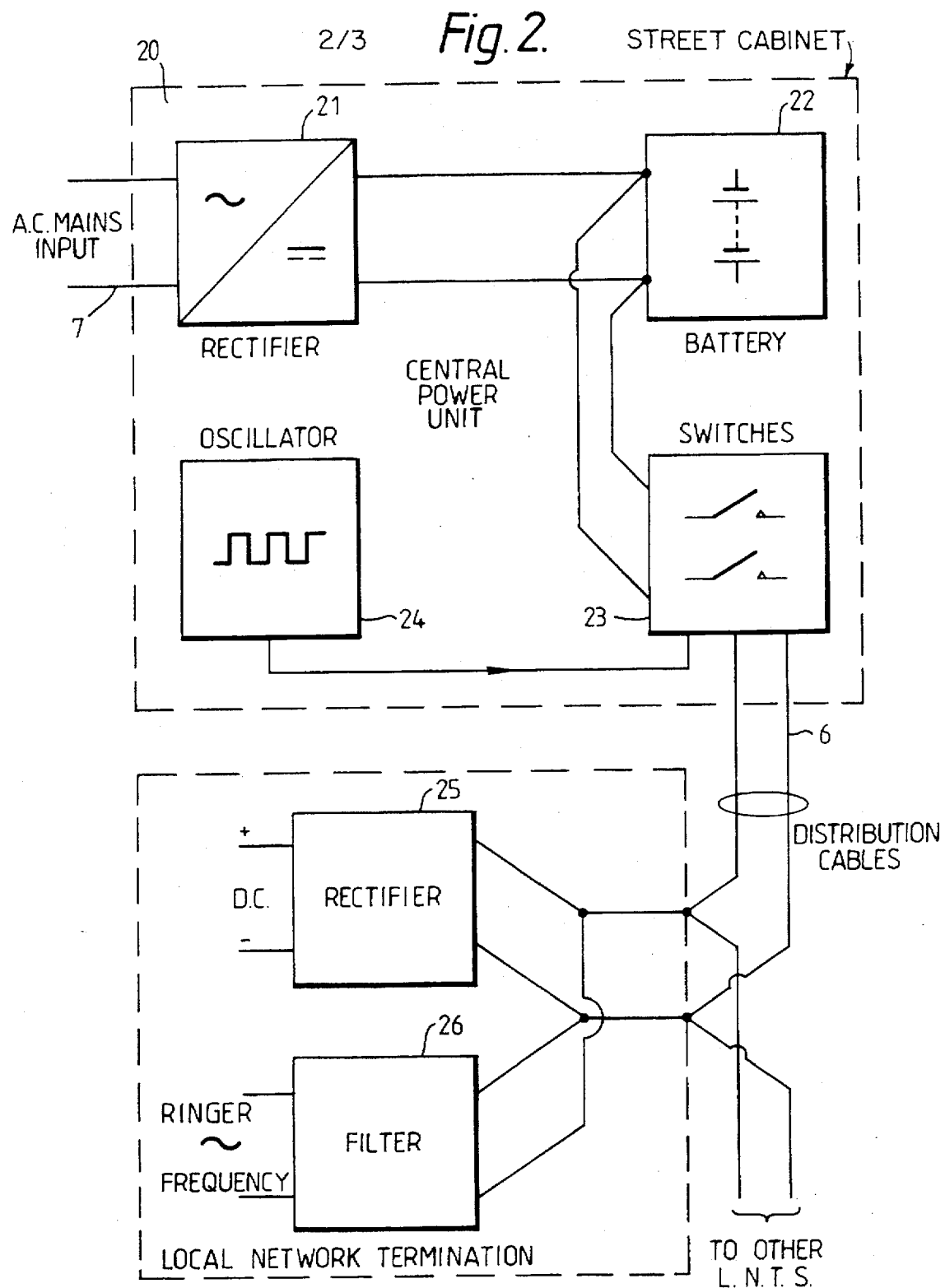
FIG. 2 is a block diagram showing part of the network of FIG. 1 in greater detail.

As will be apparent after the description of FIG. 2, cabinet 3 also contains a central power unit in the form of batteries, rectifiers and switches and is connected at 7 to a mains power supply, (e.g., 120 v AC). Two identical footway boxes 8 and 9 are shown each connected to the street cabinet by the individual optical link or fiber line 5, and by a conductive line 6 or copper link. Each footway box contains optical termination circuits generally indicated at 10 connected to the optical link 5, and power supply circuits generally indicated at 11 connected to the copper link 6. Each of the footway boxes has up to twenty optical fiber or copper line outputs 12 leading to individual telephone subscribers as shown at 13. Hence, each optical fiber 2 from the exchange 1 can handle, for example, 240 different telephone calls.

Referring now to FIG. 2 of the drawings, this shows the central power unit 20 located in the street cabinet 3 of FIG. 1. This power unit comprises a rectifier 21 connected to the 120 v AC mains, which converts the incoming AC voltage into a stable rectified DC voltage. This rectified DC voltage is supplied to the terminals of a battery 22, preferably rechargeable, allowing the system to continue operating during periods of mains supply interruption. The rectified DC voltage is also applied to modulator switches 23 controlled by a master clock or oscillator 24 operative for generating a master ringer signal at a continuous tone ringer frequency (e.g., 30 Hz in the U.S.). The master ringer signal is conducted to the switches 23 and opens and closes the switches at the ringer frequency, thereby modulating the rectified DC voltage.

The modulated voltage is supplied along the conductive line 6, also called a distribution cable, to the power supply circuits 11 of the footway boxes. Each of these power supply circuits includes a rectifier 25. The rectifier 25 rectifies the modulated voltage on the distribution cable 6 into a DC voltage useful for providing power to electronic components at the footway box and/or at the subscriber's equipment 13. Such components include, for example, a laser for transmitting signals from the subscriber's equipment back along optical fiber 5 to the exchange.

The filter 26 extracts a ringer frequency signal from the modulated voltage on the distribution cable 6. This ringer frequency signal (which is at the same frequency as the master ringer frequency generated at the clock 24) is used by electronic components in the termination circuit 11 to generate the various tones heard within the telephone earpiece at the subscriber's equipment.

Figure 3:
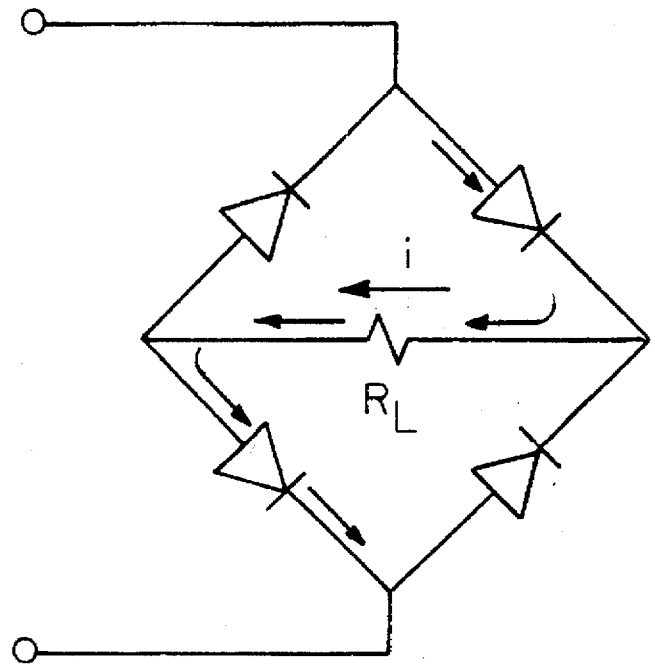
FIG. 3 is a circuit of a rectifier for use in the network.
Figure 4:
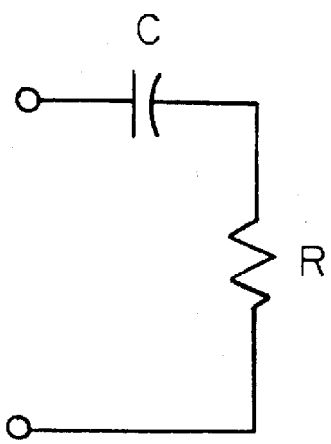
FIG. 4 is a circuit of a high pass filter for use in the network.

FIG. 3 depicts a suitable rectifier circuit for use as the rectifier 25 for converting the modulated voltage on distribution cable 6 to a DC voltage suitable for powering local electronic components. The nominal DC voltage level is 48 volts (in practice between 42 volts and 56 volts). The AC voltage would be approximately a square wave of nominal 48 volts peak. The rectifier circuit of FIG. 3 could serve as the rectifier 21 for converting the AC mains voltage to the rectified DC voltage, but would have to be modified to float charge batteries and power telecommunication electronic circuitry. FIG. 4 shows a suitable high pass filter circuit for filtering the modulated voltage to extract the ringer frequency signal. The high pass filter circuit blocks all DC and passes all frequencies from a few Hertz up (it would need to pass 50 or 60 Hz very efficiently, but the passing of higher frequencies would occur with a simple circuit but, would not be detrimental).

The benefits of the just described system are that there are a single rectifier 21 and battery 22 at the street cabinet 3 where the optical fiber 2 is first passively split. From this point downstream, the power is supplied by the distribution cable 6 to the twelve footway boxes and their 240 subscribers. No longer is there any need, as in the prior art, to incorporate a separate power supply locally, e.g., within each subscriber's telephone or within each footway box. This was not only expensive due to the large number of footway boxes, but also there is a need to monitor power consumption at separate locations.

Moreover, there is no longer any need to provide a separate clock or oscillator within each footway box to generate the ringer signal. According to the invention, the single master oscillator 24 is provided at the street cabinet 3, thus avoiding duplication of components within each footway box.

In addition, rather than providing one cable for power distribution and a second cable for ringer signal distribution, this invention proposes the single distribution cable 6 along which is conducted a modulated signal having both power and ringer signal components.

It will be understood that each of the elements described above, or two or more together, also may find a useful application in other types of constructions differing from the types described above.

While the invention has been illustrated and described as embodied in an electrical power and telephone ringer signal distribution system, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. In a telephone system including an exchange, a street cabinet connected to the exchange and supplied with AC mains voltage, and a plurality of local network terminations connected to the exchange, an arrangement for distributing electrical power and ringer signals from the street cabinet to each of the local network terminations, said arrangement comprising:

means in the street cabinet for converting the AC mains voltage to DC voltage;

clock means in the street cabinet for generating a master ringer signal at a ringer frequency;

means for modulating the DC voltage with the master ringer signal to generate modulated signal; and distribution cable means connected between the street cabinet and the local network terminations, for distributing the modulated signal to each of the local network terminations.

2. The arrangement as claimed in claim 1, wherein the converting means includes a rectifier for rectifying the AC mains voltage to the DC voltage.

3. The arrangement as claimed in claim 2, and further comprising a battery having terminals to which the DC voltage from the rectifier is conducted.

4. The arrangement as claimed in claim 1, wherein the clock means includes an oscillator for generating the master ringer signal, and wherein the modulating means includes switches connected to the DC voltage and switched between states by the master ringer signal to generate the modulated signal.

5. The arrangement as claimed in claim 1, wherein each local network termination includes rectifier means for converting the modulated signal to a DC voltage, and filter means for filtering the modulated signal to provide the master signal for telephone subscribers connected to a respective local network termination.

6. An arrangement for distributing electrical power and ringer signals in a telephone system to individual telephone subscribers, comprising:

a) a telephone exchange;

b) a plurality of street cabinets connected to, and located remotely from, the exchange, each street cabinet including
  (i) rectifier means for converting AC mains voltage supplied to the respective street cabinet to DC voltage,
  (ii) clock means for generating a master ringer signal at a ringer frequency, and
  (iii) modulator means for modulating the DC voltage with the master ringer signal to generate a modulated signal;

c) a plurality of local network terminations each connected to a plurality of individual telephone subscribers;

d) distribution cable means connected between each street cabinet and a group of said plurality of local network terminations, for distributing the modulated signal to each local network termination in said group; and e) each local network termination in said group including
  (i) means for rectifying the modulated signal supplied to the respective local network termination to supply DC voltage for the respective local network termination, and
  (ii) filter means for filtering the modulated signal supplied to the respective local network termination to supply the ringer signals for the individual subscribers.

* * * * *